(12) United States Patent
Mohideen (10) Patent No.: US 11,827,358 B1
(45) Date of Patent: Nov. 28, 2023

(54) SENSOR MAGAZINE ARRANGEMENT FOR A DRONE

(71) Applicant: Farlin Anooz Mohideen, Belmont (AU)

(72) Inventor: Farlin Anooz Mohideen, Belmont (AU)

( * ) Notice: Subject to any disclaimer, the term of this patent is extended or adjusted under 35 U.S.C. 154(b) by 0 days.

(21) Appl. No.: 18/251,513

(22) PCT Filed: Aug. 5, 2022

(86) PCT No.: PCT/AU2022/050847
§ 371 (c)(1),
(2) Date: May 2, 2023

(87) PCT Pub. No.: WO2023/023697
PCT Pub. Date: Mar. 2, 2023

(30) Foreign Application Priority Data

Aug. 26, 2021 (AU) .................................. 2021902784

(51) Int. Cl.
| | |
|---|---|
| *B64D 1/12* | (2006.01) |
| *B64D 1/22* | (2006.01) |
| *B64U 10/13* | (2023.01) |
| *B64U 101/35* | (2023.01) |
| *B64U 101/69* | (2023.01) |

(52) U.S. Cl.
CPC ............. *B64D 1/12* (2013.01); *B64D 1/22* (2013.01); *B64U 10/13* (2023.01); *B64U 2101/35* (2023.01); *B64U 2101/69* (2023.01); *B64U 2201/10* (2023.01)

(58) Field of Classification Search
CPC . B64D 1/12; B64D 1/22; B64U 10/13; B64U 2101/35; B64U 2101/69; B64U 2201/10
See application file for complete search history.

(56) References Cited

U.S. PATENT DOCUMENTS

| | | | |
|---|---|---|---|
| 6,056,237 A * | 5/2000 | Woodland | F42B 12/365 244/49 |
| 2019/0023398 A1* | 1/2019 | Albanna | A01M 21/043 |
| 2020/0023972 A1* | 1/2020 | Olsen | B64D 1/12 |

\* cited by examiner

*Primary Examiner* — Tye William Abell
(74) *Attorney, Agent, or Firm* — TraskBritt (57) ABSTRACT

A sensor magazine arrangement for a drone, the arrangement comprising a chassis configured to receive at least a portion of a drone to position a load point of such drone relative to the chassis. Also included is an array of sensor receptacles supported by the chassis, each receptacle configured to receive a sensor, and a carriage system fast with the chassis and having a manipulator configured to transfer a sensor between the array and a transfer point proximate the load point. Further included is a controller configured to control the carriage system to allow transfer of a sensor between the array and transfer point. The magazine arrangement broadly facilitates autonomous deployment and/or retrieval of a plurality of sensors via drone. An associated method is also described.

18 Claims, 7 Drawing Sheets

SENSOR MAGAZINE ARRANGEMENT FOR A DRONE

CROSS-REFERENCE TO RELATED APPLICATIONS

This application is a national phase entry under 35 U.S.C. § 371 of International Patent Application PCT/AU2022/050847, filed Aug. 5, 2022, designating the United States of America and published as International Patent Publication WO 2023/023697 A1 on Mar. 2, 2023, which claims the benefit under Article 8 of the Patent Cooperation Treaty to Australian Patent Application Serial No. 2021902784, filed Aug. 26, 2021.

TECHNICAL FIELD

This disclosure broadly relates to the field of autonomous and semi-autonomous vehicles, such as drones, and more specifically to a sensor magazine arrangement for a drone, and an associated method.

BACKGROUND

The following discussion of the background art is intended to facilitate an understanding of the disclosure only. The discussion is not an acknowledgement or admission that any of the material referred to is or was part of the common general knowledge as at the priority date of the disclosure.

A drone geophone installation arrangement has been developed, as described in International Patent Application no. PCT/AU2022/050785, the contents of which are incorporated herein by reference. Such an arrangement finds particular application in autonomously installing instruments or sensors, such as geophones, into a ground surface quickly and efficiently via a drone in a desired geographic area, which may be inaccessible, inhospitable and/or difficult to navigate.

Prior art drone-based deployment systems are known. For example, U.S. Pat. No. 6,056,237A to Woodland describes an unmanned aerial vehicle apparatus (UAV) able to carry various payload packages for in-flight deployment. The payload section is comprised of an airframe casing housing a rotary payload launcher or gravity payload release mechanism with sequential release doors for in-flight release of payload packages.

Similarly, US2020/0023972A1 to Olsen describes a payload release assembly for a drone, which has a number of sequential payload pockets wherein payload or straps for payload is locatable, with a release pin that can be displaced via a motor in order to sequentially open these pockets to sequentially release payload from the pockets.

US2019/0023398A1 to Olfactor Laboratories, Inc. describes devices for pest control as well as methods of delivering compounds and compositions for pest control purposes to bodies of water, including remote bodies of water. Specifically, such delivery means comprise delivery structures, such as racks, fittable to a drone, with delivery units releasable from these structures. As with other prior art, such delivery is via aerial deployment, typically to drop pesticides for mosquitoes into bodies of water.

The current disclosure was conceived with the goal in mind to provide a means whereby a single drone is able to effectively and efficiently deploy a plurality of sensors and instruments, such as geophones, for installation.

BRIEF SUMMARY

The skilled addressee is to appreciate that reference herein to a "drone" broadly includes reference to any suitable unmanned vehicle, such as an aircraft or land vehicle, that may be guided remotely and/or operate autonomously to reach a particular geographic location with a predetermined load or cargo. Similarly, reference herein to a "load point" generally refers to a location on the drone designed to carry such a load, e.g., a hardpoint on an airframe, or the like.

According to a first aspect of the disclosure there is provided a sensor magazine arrangement for a drone having a sensor load point, the sensor magazine arrangement comprising:
  a chassis configured to receive at least a portion of a drone to position the sensor load point of the drone relative to the chassis;
  an array of sensor receptacles supported by the chassis, each receptacle configured to receive a sensor;
  a carriage system fast with the chassis and having a manipulator configured to transfer a sensor between the array and a transfer point of the chassis; and
  a controller configured to control the carriage system to allow transfer of a sensor between the array and transfer point so that the sensor is selectively transferrable between the drone sensor load point and the chassis transfer point;
wherein the magazine arrangement is transportable to, and deployable onto, a ground surface by the drone and facilitates autonomous deployment and/or retrieval of a plurality of sensors via drone.

Typically, the chassis comprises a framework defining channels for receiving legs of a multicopter drone therein.

Typically, the chassis comprises at least one locking arrangement proximate the channels, the locking arrangement configured to lock the legs of the drone therein so that the chassis is releasably fast with the drone, the locking arrangement controlled by the controller.

In an embodiment, the load point of the drone comprises a sensor socket shaped and configured to receive a portion of the sensor, the socket including a lock configured to releasably lock the portion into the socket.

In an embodiment, the array of sensor receptacles is arranged on the chassis to facilitate balanced transport via a flying drone, i.e., the receptacles are arranged in a balanced manner to promote balanced flight, or the like.

Typically, the array comprises an even number of receptacles, such as eight, arranged in two banks of receptacles on either side of the chassis with the carriage system arranged therebetween.

Typically, the carriage system comprises the manipulator arranged on two perpendicular linear guides to allow movement of the manipulator along at least two axes to access each receptacle.

Typically, the manipulator is configured to selectively and releasably engage with a sensor receptacle in order to displace the engaged receptacle to the transfer point.

In an embodiment, the array and/or manipulator includes an electromechanical lock to lock the receptacle in place.

In an embodiment, the transfer point is located below the load point when the drone is received by the chassis to facilitate transfer of the sensor between the magazine arrangement and drone.

In an embodiment, the controller includes an interrogator for interrogating a sensor within the array and/or manipulator to transfer data from the sensor to the controller.

In an embodiment, the controller includes a transmitter configured to transmit data transferred from a sensor to a remote location.

In an embodiment, the controller includes at least one detector to determine a presence of a sensor within a sensor receptacle and/or a received drone on the chassis.

In an embodiment, the controller includes a GNSS locator whereby a geographic position of the sensor magazine arrangement is determinable, typically by a drone.

In an embodiment, the chassis includes at least one orientation identifier whereby a position and/or orientation of the sensor magazine arrangement is determinable, typically by a drone.

In an embodiment, the orientation identifier comprises a computer-vision identifier whereby a drone is able to determine a position and/or orientation of the sensor magazine arrangement, e.g., a machine-readable pattern, a flashing light, or the like.

According to a second aspect of the disclosure there is provided a method of deploying sensors via drone, the method comprising the steps of:

providing a sensor magazine arrangement in accordance with the first aspect of the disclosure;

positioning the magazine arrangement in a desired location on a ground surface by means of a drone releasably fast with the chassis; and automatically dispensing sensors from the sensor receptacle array via the carriage system to load points of at least one drone whenever a drone is received by the chassis.

Typically, the method includes the step of retrieving a deployed sensor by at least one drone depositing a sensor to the transfer point for sequestering into the array by the carriage system.

In an embodiment, the method includes the step of removing the sensor magazine arrangement by means of a drone releasably fast with the chassis.

According to a third aspect of the disclosure there is provided a method of deploying or retrieving sensors by drone using a sensor magazine arrangement in accordance with the first aspect of the disclosure above.

According to a further aspect of the disclosure there is provided a sensor magazine arrangement for a drone, and a method of deploying or retrieving sensors by drone using such a sensor magazine arrangement, substantially as herein described and/or illustrated.

BRIEF DESCRIPTION OF THE DRAWINGS

The description will be made with reference to the accompanying drawings in which.

DETAILED DESCRIPTION

Further features of the disclosure are more fully described in the following description of several non-limiting embodiments thereof. This description is included solely for the purposes of exemplifying the disclosure to the skilled addressee. It should not be understood as a restriction on the broad summary, disclosure or description of the disclosure as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will be within the understanding of the skilled addressee.

As described in the background section above, none of the prior art systems provide for a sensor magazine arrangement for a drone, as described herein, which is able to carry a plurality of sensors, such as geophones, with the magazine arrangement transportable to a desired geographic area for terrestrial deployment of such magazine arrangement by the drone. Once the magazine arrangement has been located as desired, the same drone that deployed the magazine arrangement is enabled to retrieve individual sensors from the magazine arrangement and to install such sensors into the ground, as required.

Specifically, due to the requirement for geophones to be installed into a ground surface, as described in International Patent Application no. PCT/AU2022/050785, prior art aerial ejection or deployment systems are unsuitable for this purpose, as such systems only describe aerial ejection of payload, rather than a transportable and deployable sensor magazine arrangement 10 of the disclosure. Such an arrangement can be moved and positioned on a ground surface by a drone as required, then set in position and released from the drone, after which the magazine arrangement 10 is able to dispense individual sensors to the drone for installation (and subsequent retrieval). Additionally, prior art systems do not include drones used in subsequent installation of ejected payload.

With reference now to the accompanying figures, there is broadly shown one embodiment of a sensor magazine arrangement 10 for a drone 8. Such an arrangement 10 finds particular application in facilitating autonomous deployment or retrieval of sensors 12, such as geophones, by means of a drone 8. The skilled addressee will appreciate that any suitable sensor 12 may be apposite, requirements depending. Similarly, while the exemplified embodiment shows the drone 8 as a multicopter, such as a quadcopter, the skilled addressee is to appreciate that other forms or drones are apposite, as required. For example, land vehicles may also be used, or the like.

Such a sensor magazine arrangement 10 for use with a drone 8 broadly comprises a chassis 14, an array 18 of sensor receptacles 20, a carriage system 22, and a controller 30. As will be described below, the magazine arrangement 10 facilitates autonomous deployment and/or retrieval of a plurality of sensors 12 via drone 8.

Figure 1:
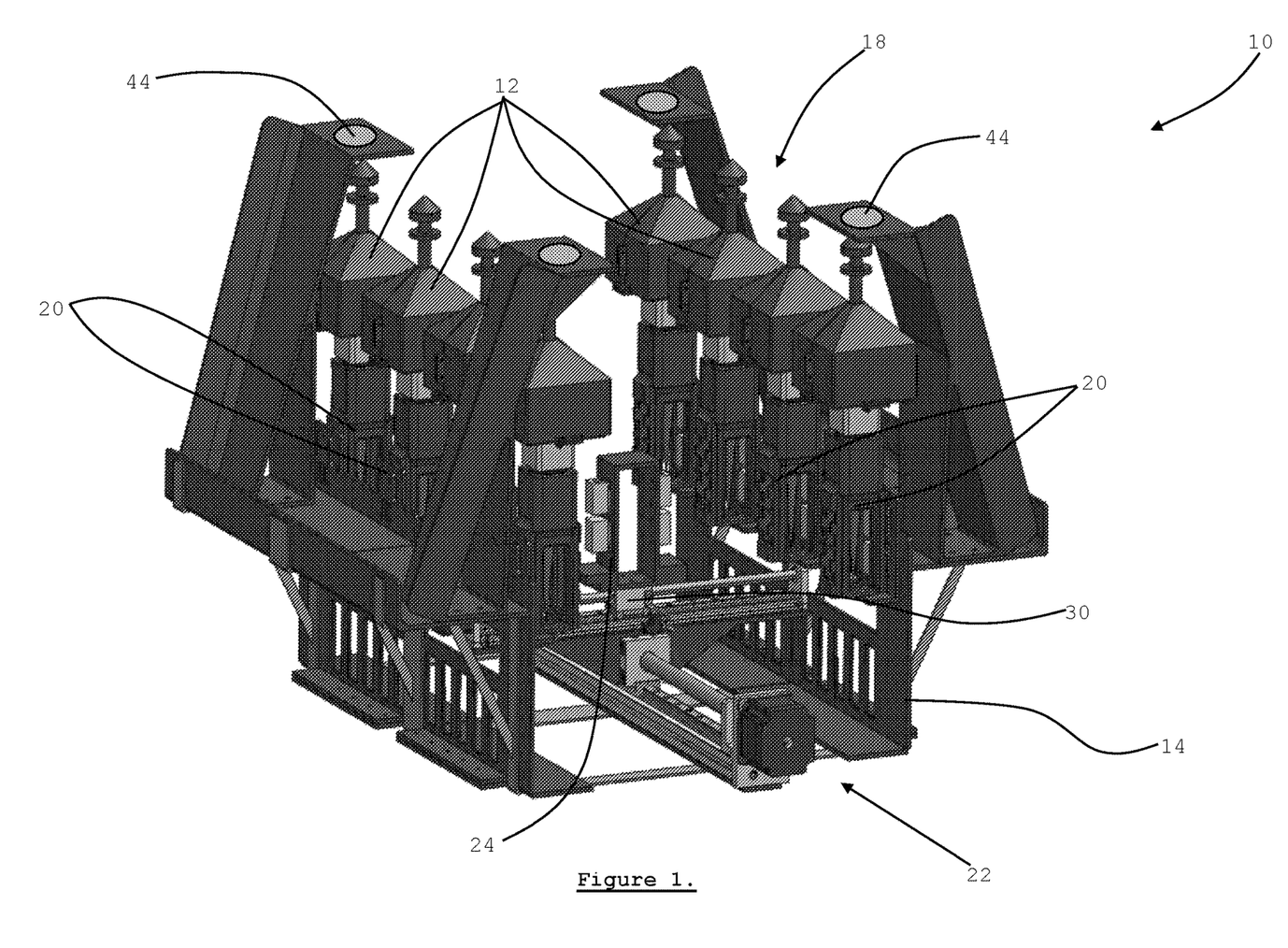
FIG. 1 is a diagrammatic perspective-view representation of one embodiment of a sensor magazine arrangement for a drone, in accordance with aspects of the disclosure.
Figure 2:
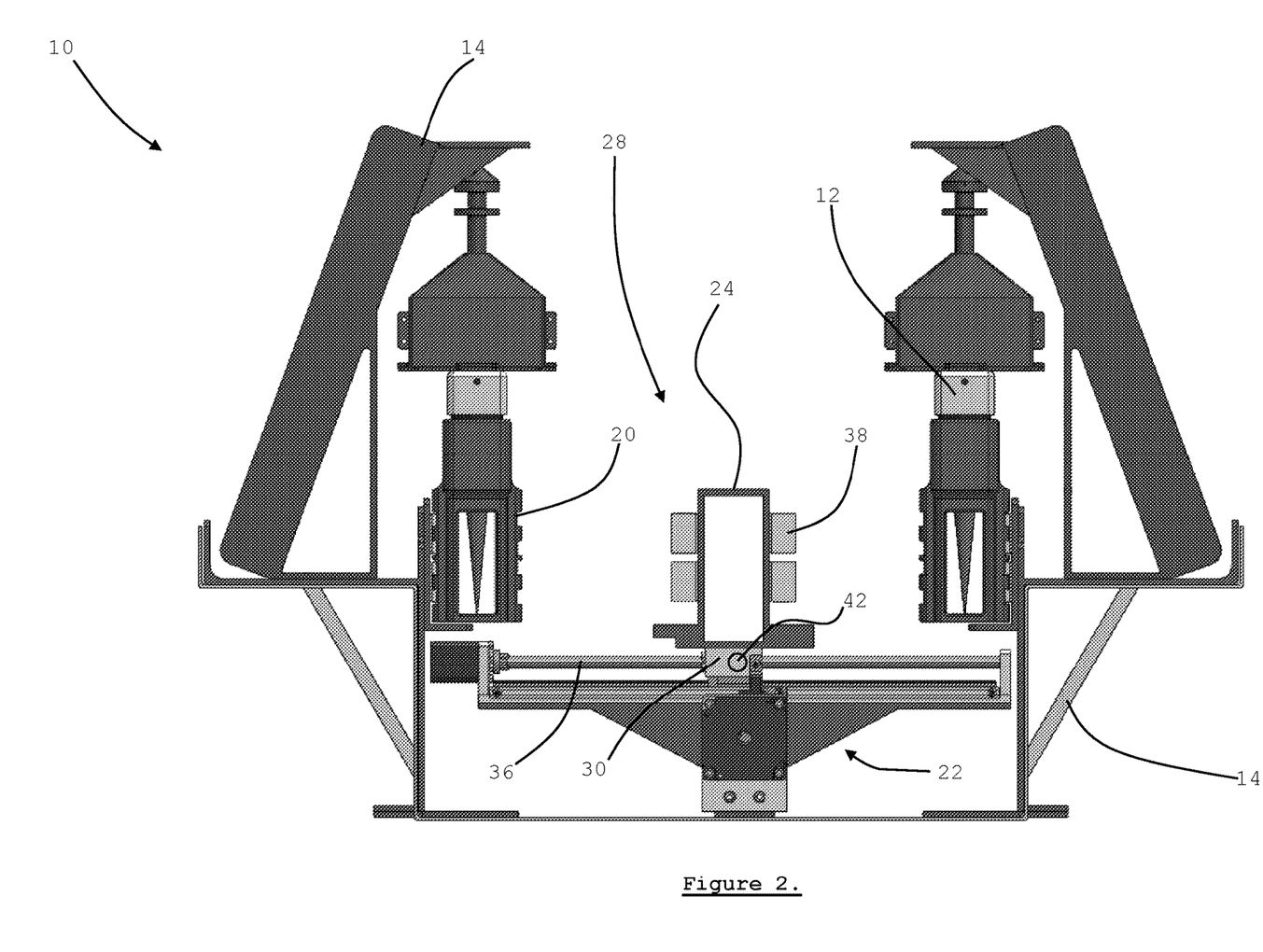
FIG. 2 is a diagrammatic front-view representation of the sensor magazine arrangement of FIG. 1.
Figure 3:
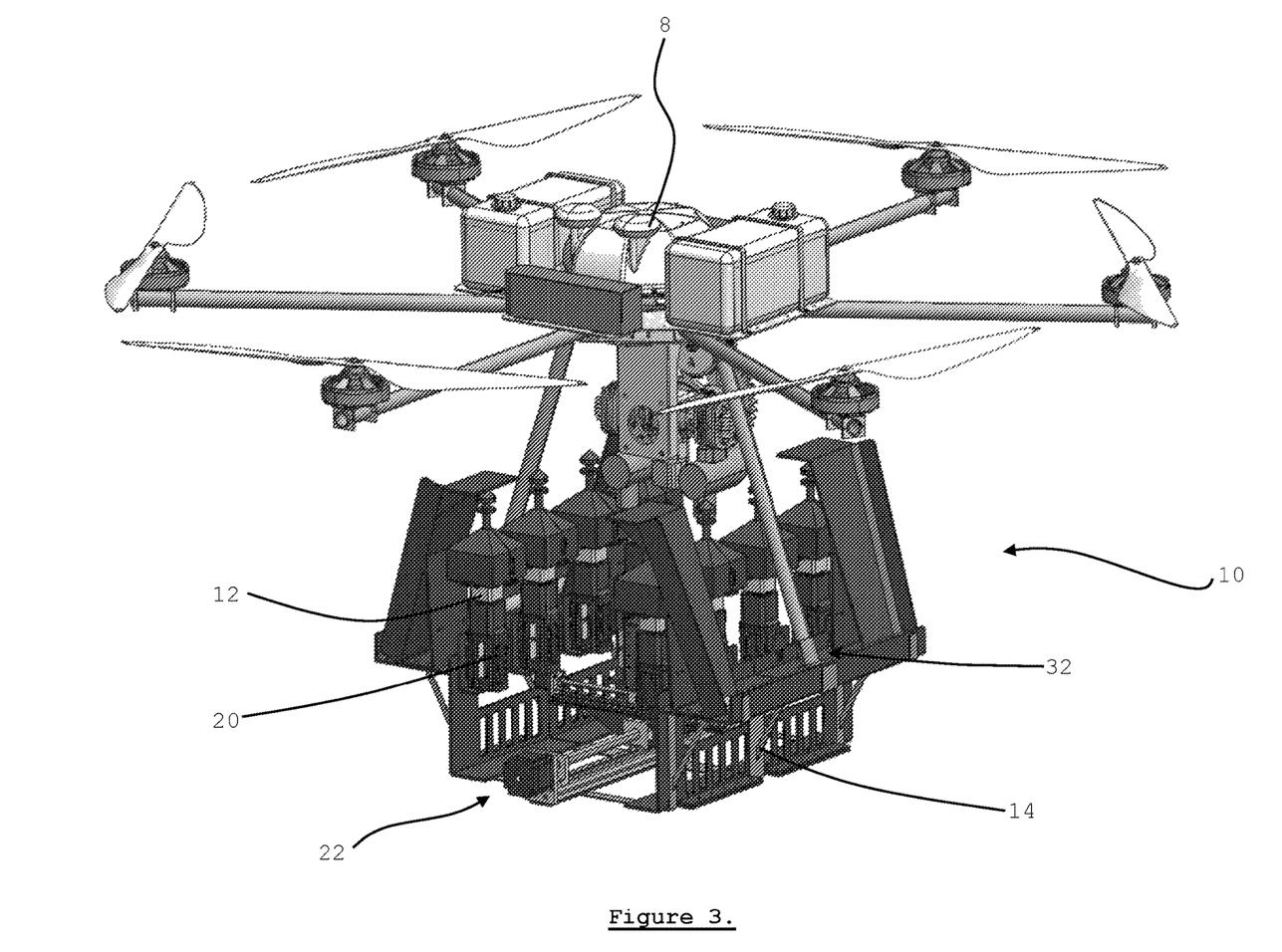
FIG. 3 is diagrammatic perspective-view representation of the sensor magazine arrangement with a drone received by a chassis thereof.
Figure 4:
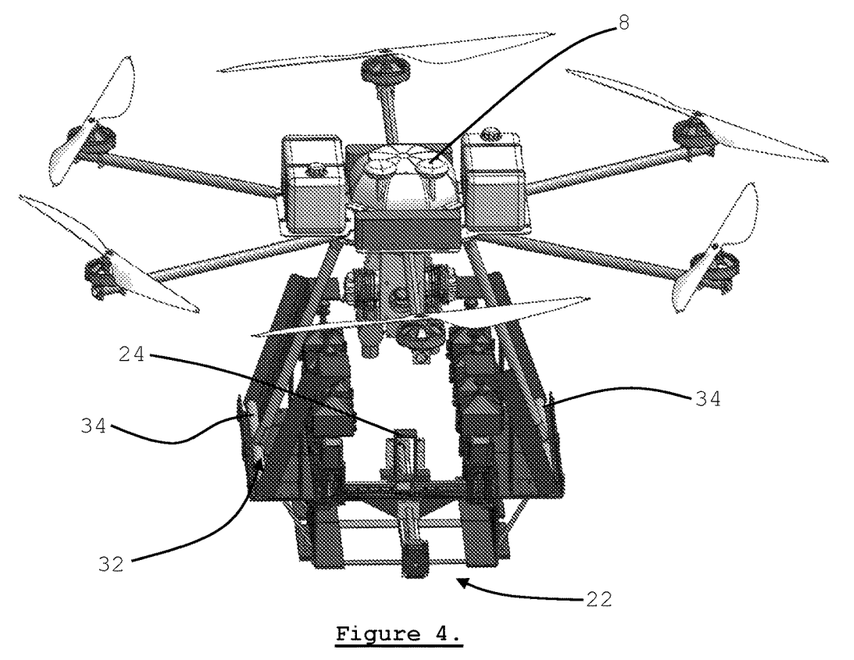
FIG. 4 is a diagrammatic top perspective-view representation of the arrangement and drone of FIG. 3.

The chassis 14 is generally configured to receive at least a portion of a drone 8 to position a load point 26 of such a drone 8 relative to the chassis 14. In the exemplified embodiment, the chassis 14 comprises a framework defining channels 32 for receiving legs of a multicopter drone 8 therein, as shown. In a typical example, the chassis 14 comprises at least one locking arrangement 34 located proximate the channels 32 and configured to lock the legs of the drone 8 therein so that the chassis 14 is releasably fast with the drone 8. In this manner, the drone 8 can be secured to the chassis 14, which allows the arrangement 10 to be transported via drone 8, as required.

Figure 10:
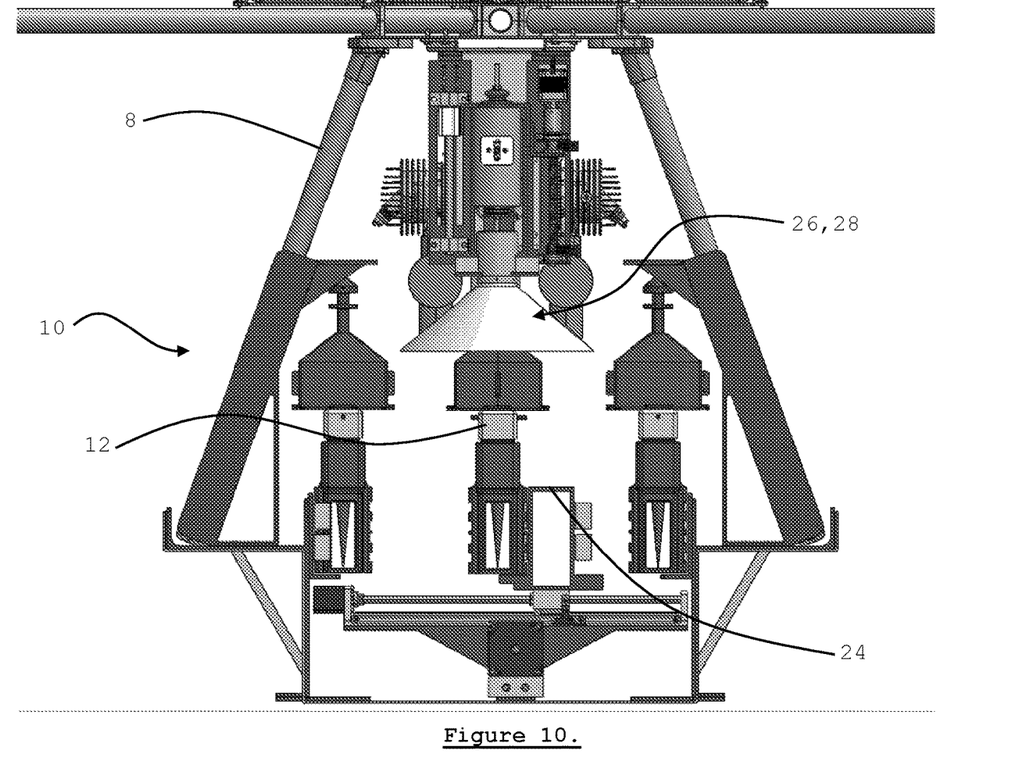
FIG. 10 is a diagrammatic front-view representation of the arrangement with a drone with a sensor at the transfer and load points.

In the exemplified embodiment, the load point 26 of the drone 8 comprises a sensor socket shaped and configured to receive a portion of the sensor 12, the socket including a lock configured to releasably lock the sensor portion into the socket. As described above, a drone geophone installation arrangement has been developed, as described in International Patent Application no. PCT/AU2022/050785, and this drone geophone installation arrangement can be used to receive and deploy sensors 12. In such an embodiment, a transfer point 28 of arrangement 10, where a sensor 12 can be transferred between the drone 8 and arrangement 10, is located below the load point 26 to facilitate engagement of the sensor 12 by the drone 8. Such a configuration also facilitates in a drone 8 returning a sensor to the arrangement for storage in the array 18.

Figure 5:
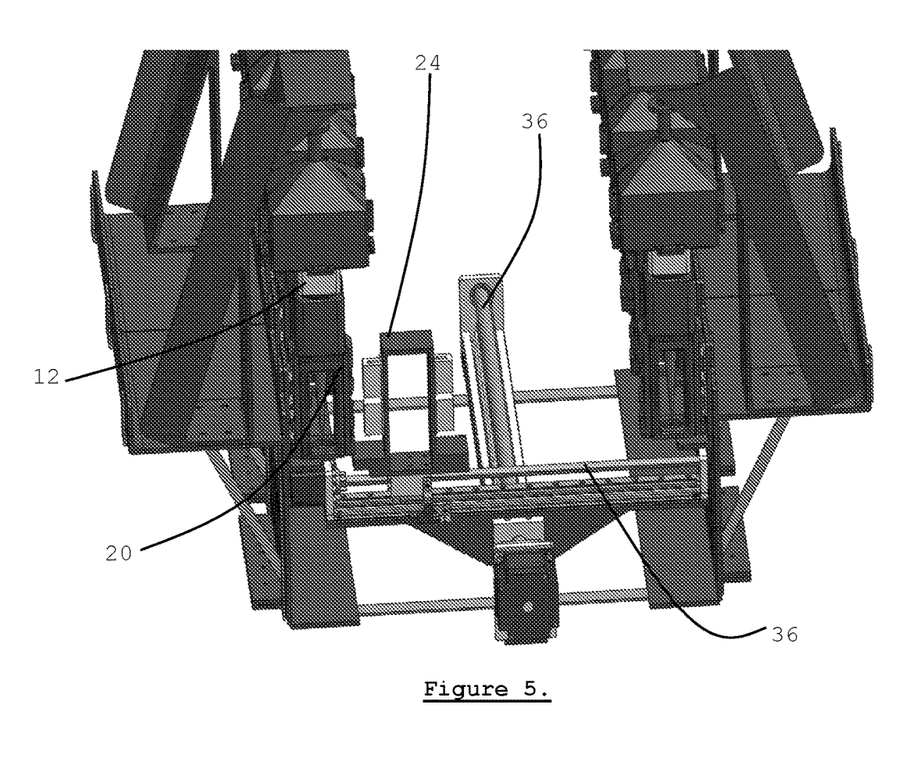
FIG. 5 is a diagrammatic closer-view representation of a carriage system and sensor receptacle array of the arrangement of FIG. 1.

Arrangement 10 also includes an array 18 of sensor receptacles 20, which is supported by the chassis 14, as shown, each receptacle 20 configured to receive a sensor 12. In an embodiment, the array 18 of sensor receptacles 20 is arranged on the chassis 14 to facilitate balanced transport via a flying drone 8, i.e., the receptacles 20 are arranged in a balanced manner to promote balanced flight, or the like. In the exemplified embodiment, the array 18 comprises an even number of eight receptacles 20, as shown, arranged in two banks of receptacles on either side of the chassis 14. Of course, variations hereon are possible, expected and within the scope of the disclosure.

Figure 6:
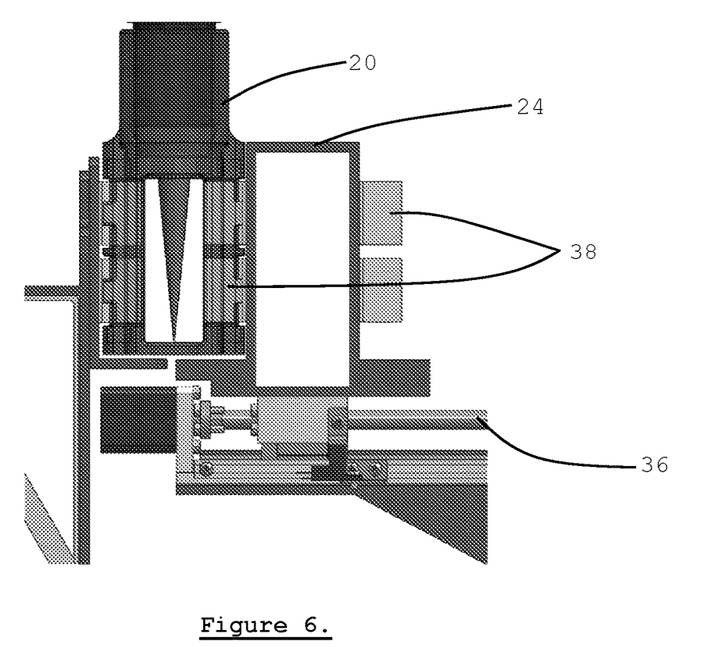
FIG. 6 is a diagrammatic closer-view representation of a manipulator of the carriage system.
Figure 7:
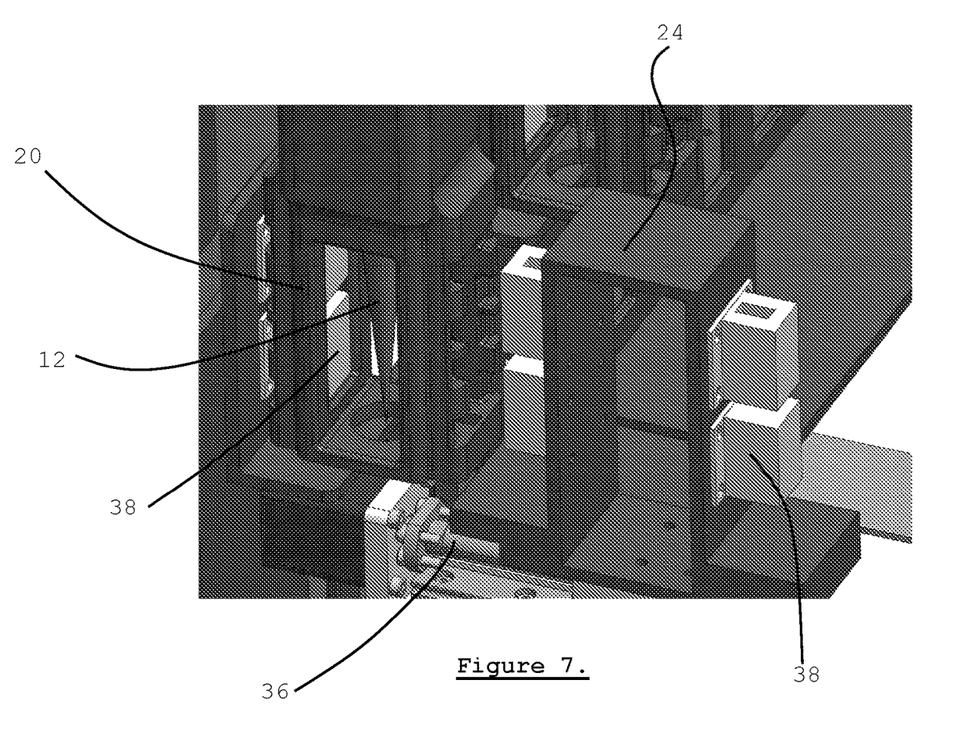
FIG. 7 is a diagrammatic perspective-view representation of the manipulator of the carriage system.

Arrangement 10 further includes a carriage system 22, which is fast with the chassis 14 and includes a manipulator 24, which is configured to transfer a sensor 12 between the array 18 and a transfer point 28 generally proximate the load point 26 of the drone. This allows the drone 8 to receive or deposit a sensor from the load point 26. Typically, the carriage system 22 comprises the manipulator 24 arranged on two perpendicular linear guides 36, as shown, to allow movement of the manipulator 24 along at least two axes to access each receptacle 20, as required.

Figure 8:
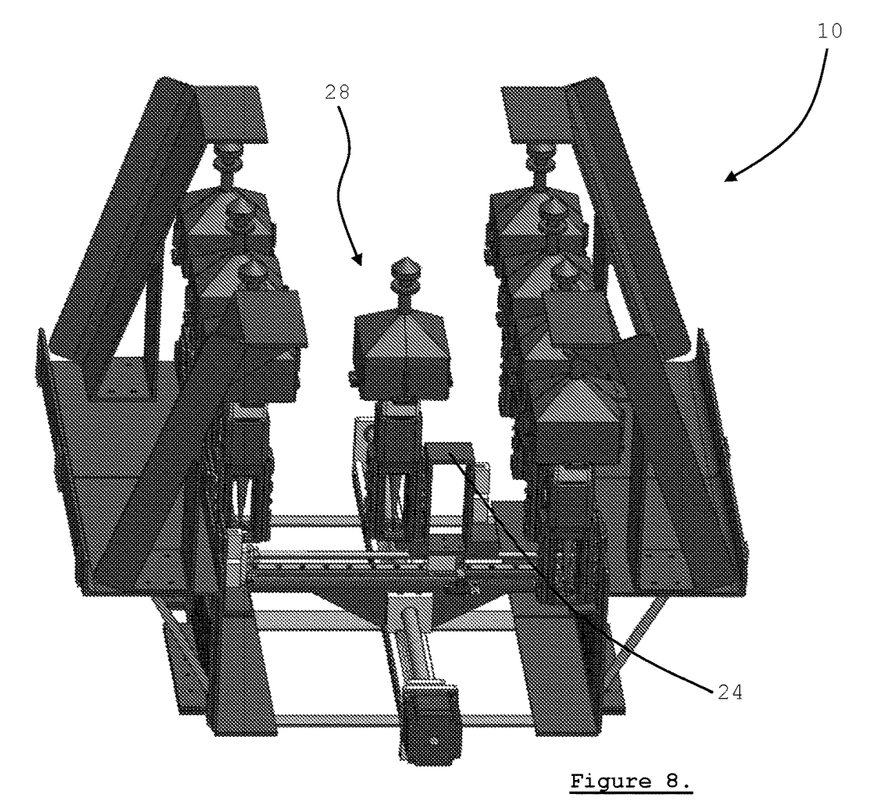
FIG. 8 is a diagrammatic perspective-view representation of the arrangement with a sensor receptacle at a transfer point for transfer to a drone.
Figure 9:
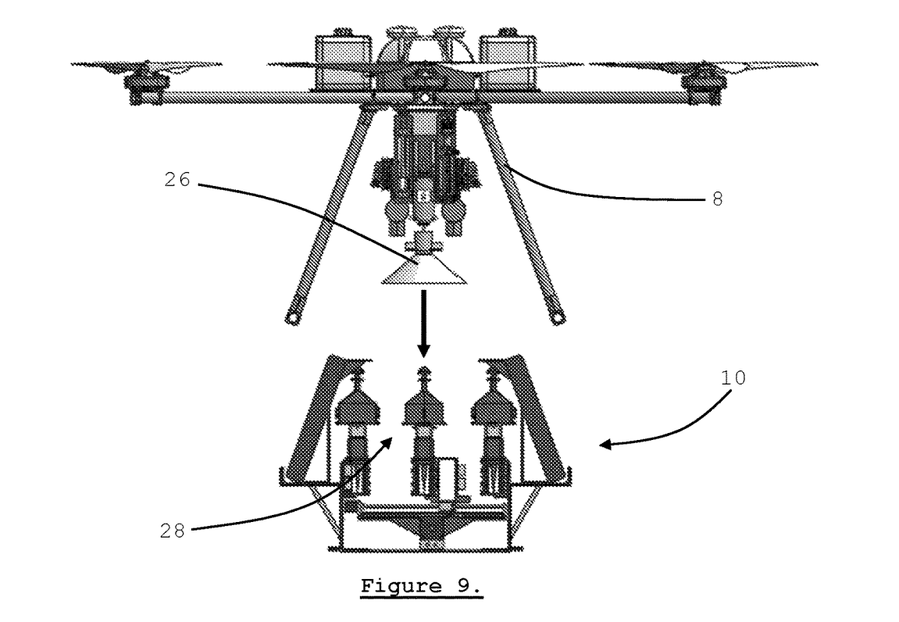
FIG. 9 is diagrammatic front-view representation of the arrangement of FIG. 8 with a drone approaching the arrangement.

The manipulator 24 is typically configured to selectively and releasably engage with a sensor receptacle 20 in order to displace or transport the engaged receptacle to the transfer point 28. In this manner, the carriage system 22 can move sensor receptacle 20 between the array 18 and the transfer point, so that sensors 12 can be deployed or retrieved via drone 8. In a typical embodiment, the array 18 and/or manipulator 24 includes an electromechanical lock 38 to lock the receptacle 20 in place, as required.

Arrangement 10 also includes a controller 30, which is generally configured to control the carriage system 22 to allow transfer of a sensor 12 between the array 18 and the transfer point 28. Such controller 30 may take a variety of forms, such as a programmable logic controller (PLC) or the like. The locking arrangement 34 of the chassis 14 is generally controlled by the controller 30.

In one embodiment, the controller 30 includes an interrogator (not shown) for interrogating a sensor within the array 18 and/or manipulator 24 in order to transfer data from the sensor 12 to the controller 30. The controller 30 may also include a transmitter (not shown) which is configured to transmit data transferred from a sensor 12 to a remote location, or the like. In addition, the controller 30 typically includes at least one detector (not shown) to determine a presence of a sensor 12 within a sensor receptacle 20, a sensor receptacle 20 within the array 18, and/or a received drone on the chassis 14.

Figure 11:
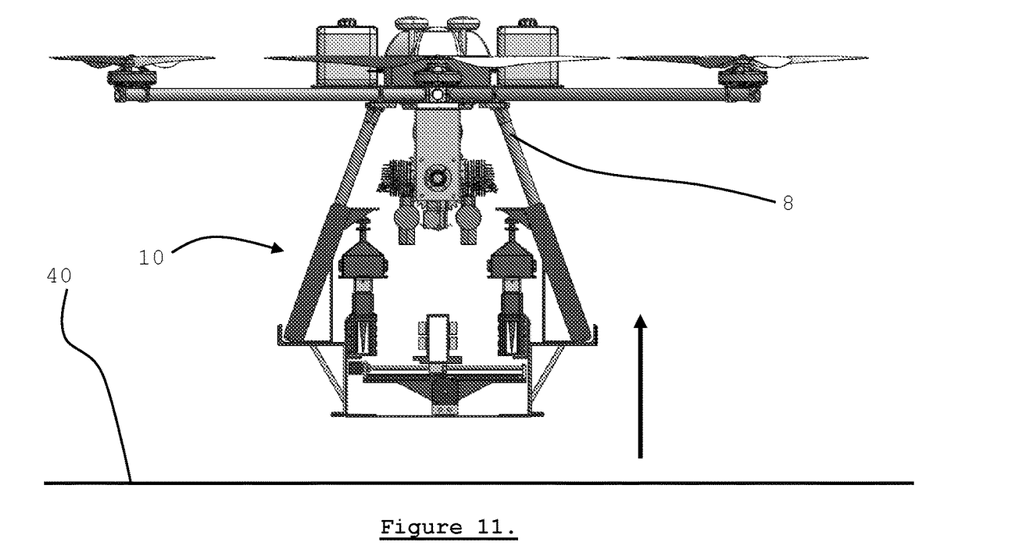
FIG. 11 is a diagrammatic front-view representation of the arrangement being carried by means of a drone.

In such a manner, arrangement 10 can be transported via drone 8 to a desired location, such as a ground surface 40, at which arrangement 10 can be placed and used sequentially and autonomously to deploy a plurality of sensors 12 to a drone for placement as required. Similarly, sensors 12 can also be returned to arrangement 10 for storage in the array 18. Once done, arrangement 10 can be removed using a drone. In one embodiment, the transport of arrangement 10, installation of sensors 12, retrieval of sensors 12, return of such sensors to the magazine arrangement 10, and removal of magazine arrangement 10 may be performed by a single drone.

In a typical embodiment, the controller 30 includes a GNSS locator 42 whereby a geographic position of the sensor magazine arrangement 10 is determinable, typically by a drone 8. The skilled addressee is to appreciate that reference herein to "GNSS" generally refers to any suitable Global Navigation Satellite System able to provide autonomous geo-spatial positioning, including the GPS, GLONASS, Galileo, Beidou and other regional satellite systems. In this manner, a drone 8 is able to locate a geographic position of arrangement 10 autonomously.

Additionally, in one embodiment, the chassis 14 also includes at least one orientation identifier 44 whereby a position and/or orientation of the sensor magazine arrangement 10 is determinable, typically by a drone 8. Such an orientation identifier 44 typically comprises a computer-vision identifier whereby a drone 8 is able to determine a position and/or orientation of the sensor magazine arrangement 10, e.g., a machine-readable pattern, or the like. In this manner, a drone 8 is able to determine the position of the arrangement 10 via, for example, GPS, and then use the orientation identifier 44, such as a unique computer-readable pattern, a flashing light, etc., to precisely determine a position and orientation of the arrangement 10 to allow the drone 8 to engage with the chassis, i.e., land accurately and safely on the chassis 14.

Accordingly, the disclosure includes an associated method of deploying sensors 12 via drone 8. Such a method broadly comprises the steps of providing the sensor magazine arrangement 10, positioning the magazine arrangement 10 in a desired location by means of a drone 8 releasably fast with the chassis 14, and automatically dispensing sensors 12 from the sensor receptacle array 18 via the carriage system 22 to load points 26 of at least one drone 8 whenever a drone is received by the chassis 14. Such a method typically includes the step of retrieving a deployed sensor by at least one drone depositing a sensor to the transfer point 28 for sequestering into the array 18 by the carriage system 22.

It is believed to be particularly advantageous that the disclosure provides for sensor magazine arrangement 10, which is configured to facilitate deployment or retrieval of a plurality of sensors autonomously via a drone, as described herein. Sensor magazine arrangement 10 is also transportable and deployable by drone.

Optional embodiments of the disclosure may also be said to broadly consist in the parts, elements and features referred to or indicated herein, individually or collectively, in any or all combinations of two or more of the parts, elements or features, and wherein specific integers are mentioned herein, which have known equivalents in the art to which the disclosure relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a," "an," "the," and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items. No language in the specification should be construed as indicating any non-claimed subject matter as essential to the practice of the claimed subject matter.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the disclosure, or similar exemplary language (e.g., "such as") herein, is not made in an exclusive sense. Various substantially and specifically practical and useful exemplary embodiments of the claimed subject matter are described herein, textually and/or graphically, for carrying out the claimed subject matter.

Accordingly, one example may exemplify certain aspects of the disclosure, whilst other aspects are exemplified in a different example. These examples are intended to assist the skilled person in performing the disclosure and are not intended to limit the overall scope of the disclosure in any way unless the context clearly indicates otherwise.

Variations (e.g., modifications and/or enhancements) of one or more embodiments described herein might become apparent to those of ordinary skill in the art upon reading this disclosure. Skilled artisans are expected to employ such variations as appropriate, and it is intended for the claimed subject matter to be practiced other than as specifically described herein.

Any method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A sensor magazine arrangement for a drone having a sensor load point, comprising:
    a chassis configured to receive at least a portion of the drone to position the sensor load point of the drone relative to the chassis, the chassis comprising a framework defining channels for receiving legs of a multicopter drone therein and having at least one locking arrangement proximate the channels, the locking arrangement configured to lock the legs of the drone therein so that the chassis is releasably fast with the drone;
    an array of sensor receptacles supported by the chassis, each sensor receptacle configured to receive a sensor;
    a carriage system fast with the chassis and having a manipulator configured to transfer the sensor between the array of sensor receptacles and a transfer point of the chassis; and
    a controller configured to control the carriage system and locking system to allow transfer of the sensor between the array of sensor receptacles and the transfer point so that the sensor is selectively transferrable between the sensor load point of the drone and the transfer point of the chassis;
    wherein the magazine arrangement is transportable to, and deployable onto, a ground surface by the drone and facilitates one or more of autonomous deployment and retrieval of a plurality of sensors via the drone.

2. The sensor magazine arrangement of claim 1, wherein the sensor load point of the drone comprises a sensor socket shaped and configured to receive a portion of the sensor, the sensor socket configured to releasably secure the portion of the sensor into the sensor socket.

3. The sensor magazine arrangement of claim 1, wherein the array of sensor receptacles is arranged on the chassis to facilitate balanced transport via a flying drone.

4. The sensor magazine arrangement of claim 1, wherein the array of sensor receptacles comprises an even number of the sensor receptacles arranged in two banks of the sensor receptacles on either side of the chassis with the carriage system arranged therebetween.

5. The sensor magazine arrangement of claim 1, wherein the carriage system comprises the manipulator arranged on two perpendicular linear guides to allow movement of the manipulator along at least two axes to access each sensor receptacle.

6. The sensor magazine arrangement of claim 1, wherein the manipulator is configured to selectively and releasably engage with a sensor receptacle in order to displace the engaged sensor receptacle to the transfer point.

7. The sensor magazine arrangement of claim 1, wherein one or more of the array of sensor receptacles and the manipulator includes an electromechanical lock to releasably lock a sensor receptacle in place.

8. The sensor magazine arrangement of claim 1, wherein the transfer point is located below the sensor load point when the drone is received by the chassis to facilitate transfer of the sensor between the magazine arrangement and the drone.

9. The sensor magazine arrangement claim 1, wherein the controller includes at least one detector configured to determine a presence of the sensor within one or more of a sensor receptacle and a received drone on the chassis.

10. The sensor magazine arrangement of claim 1, wherein the controller includes a GNSS locator whereby a geographic position of the sensor magazine arrangement is determinable.

11. The sensor magazine arrangement of claim 1, wherein the controller includes an interrogator for interrogating the sensor within one or more of the array of sensor receptacles and the manipulator to transfer data from the sensor to the controller.

12. The sensor magazine arrangement of claim 11, wherein the controller includes a transmitter configured to transmit data transferred from the sensor to a remote location.

13. The sensor magazine arrangement of claim 1, wherein the chassis includes at least one orientation identifier whereby one or more of a position and an orientation of the sensor magazine arrangement is determinable.

14. The sensor magazine arrangement of claim 13, wherein the orientation identifier comprises a computer-vision identifier whereby the drone is able to determine one or more of a position and an orientation of the sensor magazine arrangement.

15. A method of deploying sensors via a drone, comprising:
    providing the sensor magazine arrangement of claim 1;
    positioning the magazine arrangement in a location on a ground surface using the drone, the drone releasably fast with the chassis; and
    automatically dispensing the sensors from the sensor receptacle array via the carriage system to load points of at least one drone when the at least one drone is received by the chassis.

16. The method of claim 15, further comprising retrieving a deployed sensor by at least one drone depositing a sensor to the transfer point for sequestering into the array by the carriage system.

17. The method of claim 15, further comprising removing the sensor magazine arrangement using the drone releasably fast with the chassis.

18. A method of deploying or retrieving sensors by a drone using the sensor magazine arrangement of claim 1.

* * * * *

UNITED STATES PATENT AND TRADEMARK OFFICE
CERTIFICATE OF CORRECTION

| | | |
|---|---|---|
| PATENT NO. | : 11,827,358 B1 | |
| APPLICATION NO. | : 18/251513 | |
| DATED | : November 28, 2023 | |
| INVENTOR(S) | : Farlin Anooz Mohideen | |

It is certified that error appears in the above-identified patent and that said Letters Patent is hereby corrected as shown below:

In the Specification
    Column 3, Line 58, change "chassis thereof," to --chassis thereof;--

In the Claims
    Claim 9, Column 8, Line 64, change "arrangement claim 1," to --arrangement of claim 1,--

Signed and Sealed this
Nineteenth Day of March, 2024

*Katherine Kelly Vidal*
Katherine Kelly Vidal
*Director of the United States Patent and Trademark Office*